Sept. 6, 1949.  J. R. LINDSAY  2,481,029
SPRING SUSPENSION FOR VEHICLES
Filed Oct. 8, 1945
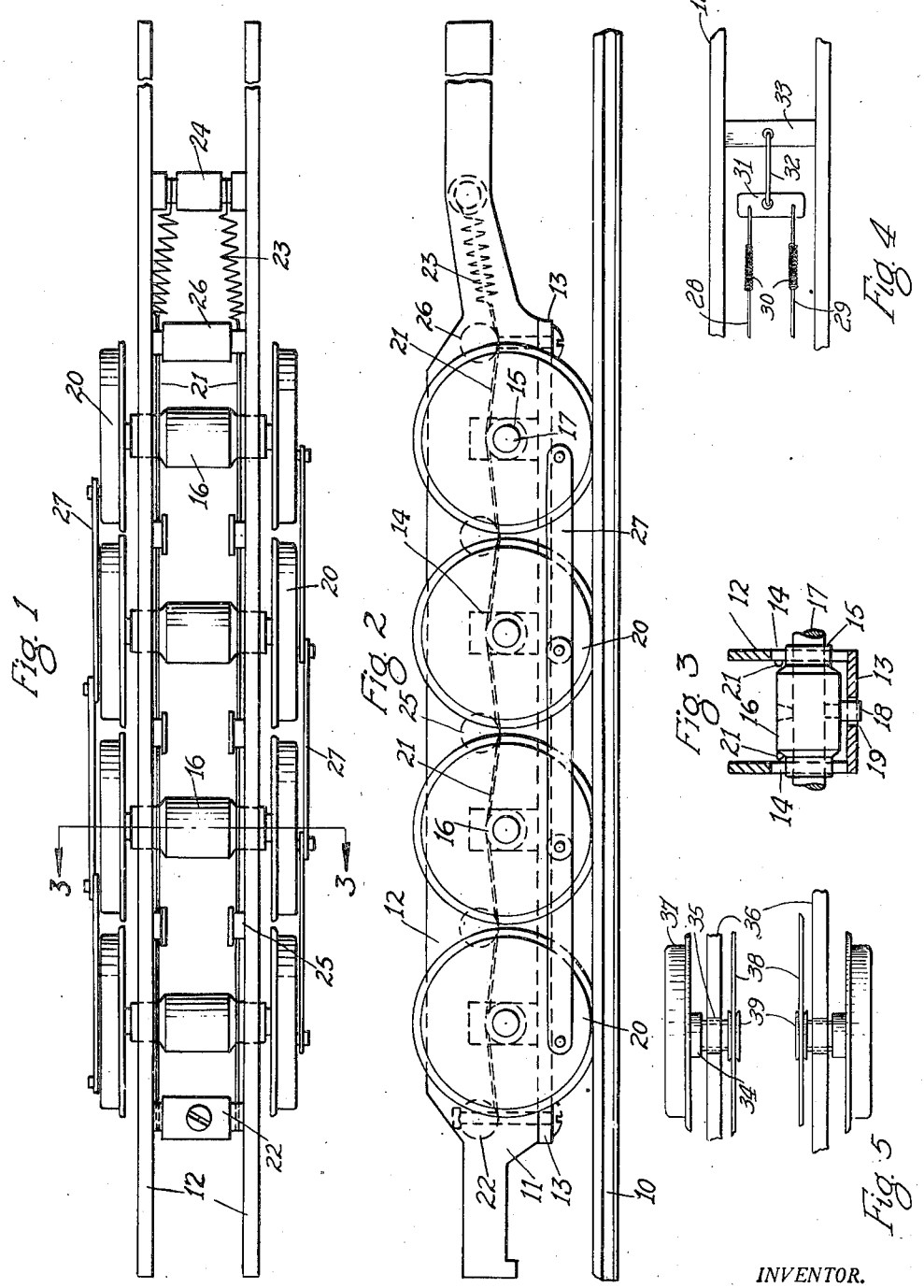
INVENTOR.
James R. Lindsay
BY
Cromwell, Greist & Warden
ATTORNEYS Patented Sept. 6, 1949

2,481,029

UNITED STATES PATENT OFFICE 2,481,029

SPRING SUSPENSION FOR VEHICLES

James R. Lindsay, Arlington Heights, Ill., assignor to Gordon Varney, Chicago, Ill.

Application October 8, 1945, Serial No. 620,896

3 Claims. (Cl. 105—212)

This invention relates to an improved spring suspension for multi-wheeled vehicles, in particular, railway locomotives, cars and the like.

It is an object of the invention to provide a floating suspension which affords an equalized support for the wheel axles of a locomotive or like multi-wheeled car or vehicle, employing a very simple and inexpensive yet sturdy resilient cable device for this purpose.

It is a further object to provide a suspension of the type described which is readily and extremely inexpensively manufactured and assembled, and which provides an independent, dual cable, fully equalized spring suspension for a vehicle.

The foregoing statements are indicative in a general way of the nature of the invention, but other and more specific objects will be apparent to those skilled in the art upon a full understanding of the construction and operation of the device.

One embodiment of the invention is presented herein for the purpose of exemplification, but it will be appreciated that the invention is susceptible of incorporation in other modified forms coming equally within the scope of the appended claims.

In the drawings:

Fig. 1 is a diagrammatic top plan view conventionally illustrating details of the spring suspension in association with a standard set of wheels and the chassis or frame of a railway vehicle;

Fig. 2 is a view in side elevation further illustrating details of the floating suspension;

Fig. 3 is a fragmentary view in section on a line corresponding to line 3—3 of Fig. 1, still further illustrating details of the floating axle mounting embodied in the invention; and Figs. 4 and 5 are diagrammatic plan views illustrating modified embodiments of the invention.

This invention is directed to an improved and highly simple yet effective, resilient wheel mounting or suspension for vehicles. While the suspension has particular value in an embodiment in a model railway vehicle, I desire it to be clearly understood that its application is by no means limited to this field. On the contrary, the principles of the invention diagrammatically illustrated herein have utility and value as applied to any multi-wheeled vehicle, railway, automotive or the like, wherein a resilient equalized support of a chassis is desired. Moreover, as will be apparent to those skilled in the art, it also possesses merit in its applicability to creeper or tracklaying types of vehicles wherein endless tracks are supported by a series of wheels or bogies.

Generally considered, the invention resides in a spring supported, flexible cable arrangement for sustaining a carriage or chassis on the journals of the wheel axles in such manner that jolts arising from track irregularities or spread joints of the track are absorbed at the individual wheels without pronounced pounding effect. A very desirable equalization of the load on the wheels is provided, in that upward displacement of a wheel journal upon encountering an obstruction results in tensioning of the cable and simultaneous increasing of the force at the other journals to counteract or absorb shock at those points. The floating effect made possible by the cables enables jars to be absorbed in the cable (or a cable-sustaining spring) without subjecting the vehicle to abrupt and substantial shocks such as might, in the case of a model, displace the same from the track, or create an objectionable amount of destructive vibration or noise and clatter, in any case.

Referring to the drawings, the reference numeral 10 is employed to designate a pair of tracks on which the railway vehicle chosen for the purpose of illustration, more specifically the chassis 11 thereof, is borne in use. The chassis, as diagrammatically shown, consists of a pair of suitably rigid side frame members 12 secured together by a bottom member 13 coextensive in length therewith or by other connecting and bracing means, thereby defining a chassis or frame of U-shaped section on which superstructure of any desired character is mounted. Such superstructure is not illustrated since it bears in no way on the present invention.

Above the bottom member 13, the side members 12 of the carriage are provided with transversely aligned, vertically extending, pairs of guide slots 14 which slidably and floatingly receive the ends 15 of a barrel-like wheel journal member 16 through which the wheel axle 17 extends. The journal member 16, along with axle 17, has limited vertical floating movement in the slots 14, being restrained thereby in the direction of the length of the chassis; and member 16 is also provided with a radially extending lug 18 which projects vertically downwardly through an aperture 19 in the bottom member 13 of the frame 12 so as to prevent rotation of member 16. Axial movement of member 16 is restrained by aperture 19.

The chassis is supported on the journal member 16 by a pair of flexible wires or cables 21 adjacent either side of the chassis and anchored thereto, said cables extending longitudinally of the carriage. One end of each of the cables is anchored in a fixed cross piece or strut 22 disposed between the frame members 12 and the opposite ends of the cables are connected by coil tension springs 23 to a similar cross piece 24 adjacent the opposite end of the chassis. Intermediate the anchored cable ends, the cables alternately pass over and bear on the wheel journals 16 and under the restraining members or buttons 25 which are secured on opposite internal sides of the frame members 12. Between the spring-anchoring rod 24 and the adjacent wheel journal 16 a cross member 26 serves the function of vertically restraining the spring connected end of the cables.

The reference numeral 27 merely designates a plurality of driving links articulated to one another and to the respective wheels 20 as in a conventional locomotive drive. In applications of the invention to a vehicle having a plurality of positively driven wheels arranged in a row or parallel rows the present invention has a particular advantage in the maintenance of uniform traction on the drivers. However, as stated, and as will be appreciated, the suspension constituted by the above provisions is equally applicable to vehicles other than a locomotive carriage, with corresponding advantages of an independent, wheel-equalizing and, moreover, very inexpensive mounting; and in this respect the invention is not to be considered as being particularly limited.

In use, the cables 21, tensioned by coil springs 23, serve to sustain the chassis 12 on the series of wheel journals 16 and to afford a floating mounting for the carriage, by reason of which the wheel journals yield upwardly individually upon encountering a track obstruction or the like, being accommodated by the resiliently sustained cables 21. The increased tensioning of the cables is attended by an increase in downward force on the wheel journals, for a very desirable equalized supporting action which imparts extremely smooth riding qualities to a carriage or the like on the chassis. As an alternative construction the cables themselves could be in the form of elongated spring elements, of metal or other material, or the inherent resilience of the cable itself may be relied on. This structure is characterized by its simplicity and inexpensiveness, both in material and assembly, as contrasted with relatively complicated suspensions heretofore availed of for a floating wheel mounting.

In addition to equalization of downward forces on the journals longitudinally of the chassis, it will be evident that cross-equalization of the wheels on each journal is readily feasible by employing a structure such as that illustrated in Fig. 4. Here the cables 28, 29 adjacent either side of the chassis side frames 12 are connected through coil springs 30 with opposite ends of a cross bar or yoke 31. This yoke is in turn sustained at a medial point by a further cable or pivoted link 32 which at its other end is anchored to a transverse support 33. Hence, an obstruction to or jar on a wheel on one side of the vehicle is absorbed, with resultant tensioning of cable 28 which immediately effects an increased tensioning of the other cable through the pivoted yoke. As a result a uniform, equalized downward force is caused to be applied to all journals, on either side of the chassis, at all times in the operation of the structure.

Furthermore, the wheels may be independently slidable in the guide slots 14 (or equivalent floating guide), and not necessarily coupled in pairs through a transverse trunnion or journal member 16. Thus, in Fig. 5 I illustrate a pair of individual wheel bearings 34 slidable vertically in slots 35 in the respective side frames 36 and appropriately restrained from rotation therein, the wheels 37 being rotatably carried by said bearings. The cables 38 are trained over grooved, arcuate antifriction guides 39 affixed to said bearings at the top thereof, for a smooth, unrestricted and equalized distribution of downward reactive force at the several individual wheel journals.

Various other refinements and modifications in the principles illustrated in the drawings and described will doubtless occur to those skilled in the art. For example, by the term cable or cable member in the foregoing specification and in the claims, I intend to include related flexible and/or elongated resilient elements of a similar tension transmitting character, such as ropes, bands and the like, whether associated with spring elements or whether relying for resilience in action on their own inherent resiliency.

While, as stated, the principles of the invention are applicable to vehicle suspensions generally, I have found the same to be especially well suited for embodiment of miniature or model vehicles in particular model railway locomotives, cars, etc., characterized by a multiple wheel construction.

An important advantage resident in this invention is realized when the equalized spring suspension is applied to a multi-wheeled driving vehicle such as a railway locomotive or the like. In such case the equalization of downward forces on the wheel journals referred to above enables full uniform distribution of the tractive effort, so that each of the drivers is performing its full percentage of the work. This is highly important, for maximum efficiency is not possible in a situation where certain of the drivers performed an undue amount of the work while others, because of defective design or other reason, are in effect idling, either fully or partially.

I claim:

1. An equalized floating suspension for multi-wheeled vehicles, comprising a series of wheel members spaced longitudinally of the vehicle, means for positively driving each of said wheel members, means guiding said members for vertical movement relative to the vehicle, elongated flexible cable means anchored at one end to the vehicle adjacent one end of the series, spring means resiliently connecting the other end of said cable means to the vehicle adjacent the opposite end of said series, said cable means intermediate said ends extending over and engaging said driven members to springably support the vehicle thereon with an equalized restraining action, and means restraining said cable means downwardly between said members.

2. An equalized floating suspension for multi-wheeled vehicles, comprising a series of wheel journal members spaced in rows longitudinally of the vehicle, wheels carried by said journal members, means for positively driving each of said wheels, means guiding said members for vertical movement relative to the vehicle, spaced flexible and longitudinally yieldable cables disposed parallel to one another, opposite ends thereof being supported by the vehicle, said respective cables intermediate said ends engaging and downwardly restraining cables intermediate said ends engaging and downwardly restraining the driven members of said respective rows, and means to downwardly restrain said cables between said respective journal members, to springably support the vehicle thereon, with the downward cable force on the members uniformly equalized on the members longitudinally of each row.

3. An equalized suspension for a multi-wheeled driving vehicle, comprising a vehicle frame, a series of wheel members spaced longitudinally of said frame, means for positively driving each of the wheel members of said series, means guiding said wheel members for vertical movement relative to the frame, elongated flexible cable means secured at one end to the frame adjacent one end of the series, spring means resiliently connecting the other end of said cable means to the frame adjacent the opposite end of said series, and cable restraining elements alternating with successive driven wheel members of said series, said cable means intermediate the ends thereof extending over said successive driven wheel members and under said alternating restraining elements for equalized frame suspending and wheel thrust effort.

JAMES R. LINDSAY.

REFERENCES CITED

The following references are of record in the file of this patent:

UNITED STATES PATENTS

| Number | Name | Date |
|---|---|---|
| 253,993 | Estrade | Feb. 21, 1882 |
| 1,404,966 | Johnson | Jan. 31, 1922 |

FOREIGN PATENTS

| Number | Country | Date |
|---|---|---|
| 9,607 | Great Britain | 1896 |

Certificate of Correction

Patent No. 2,481,029 September 6, 1949

JAMES R. LINDSAY

It is hereby certified that error appears in the printed specification of the above numbered patent requiring correction as follows:

Column 4, lines 74 and 75, strike out the words "cables intermediate said ends engaging and downwardly restraining";

and that the said Letters Patent should be read with this correction therein that the same may conform to the record of the case in the Patent Office.

Signed and sealed this 28th day of February, A. D. 1950.

[SEAL]

THOMAS F. MURPHY,
*Assistant Commissioner of Patents.*